(12) United States Patent
Sukruangsap (10) Patent No.: US 10,736,269 B2
(45) Date of Patent: Aug. 11, 2020

(54) FRUIT PICKER

(71) Applicant: Apichat Sukruangsap, Samutprakan (TH)

(72) Inventor: Apichat Sukruangsap, Samutprakan (TH)

( * ) Notice: Subject to any disclaimer, the term of this patent is extended or adjusted under 35 U.S.C. 154(b) by 49 days.

(21) Appl. No.: 15/004,052

(22) Filed: Jan. 22, 2016

(65) Prior Publication Data

US 2017/0208744 A1 Jul. 27, 2017

(51) Int. Cl.
*A01D 46/24* (2006.01)
*A01D 46/247* (2006.01)
*A01D 11/06* (2006.01)

(52) U.S. Cl.
CPC ........... *A01D 46/247* (2013.01); *A01D 11/06* (2013.01)

(58) Field of Classification Search
CPC .... A01D 46/247; A01D 46/24; A01D 46/243; A01D 46/00; A01D 46/087
See application file for complete search history.

(56) References Cited

U.S. PATENT DOCUMENTS

| | | | | |
|---|---|---|---|---|
| 55,150 A | * | 5/1866 | Newcomb | A01D 46/247 30/289 |
| 112,622 A | * | 3/1871 | Ostrander | A01D 46/005 56/332 |
| 132,634 A | * | 10/1872 | Colthar | A01D 46/247 56/339 |
| 457,516 A | * | 8/1891 | Marsh | A01D 46/247 56/340 |
| 515,702 A | * | 2/1894 | Abbott | A01D 46/005 56/332 |
| 598,401 A | * | 2/1898 | Terrill | A01D 46/247 56/339 |
| 626,058 A | | 5/1899 | Fliegenschmidt | |

(Continued)

FOREIGN PATENT DOCUMENTS

| CN | 201467708 U | 5/2010 |
|---|---|---|
| CN | 104429361 A | 3/2015 |

(Continued)

OTHER PUBLICATIONS

"Fruit Picker Basket" from amazon.com, p. 1, Retrieved on Jan. 21, 2016 at http://www.amazon.com/Fruit-Picker-FRUIT-PICKER-BASKET/dp/B000CZ4J6Y/ref=sr_1_3?ie=UTF8&qid=1449364698&sr=8-3&keywords=fruits+picker.

(Continued)

*Primary Examiner* — Jamie L McGowan
(74) *Attorney, Agent, or Firm* — Muncy, Geissler, Olds & Lowe, P.C.

(57) ABSTRACT

A fruit picker includes first and second curved sections, a handle and a bag. The first and second curved sections are outwardly curved to form a leaf-shaped space therebetween. The first curved section and a second curved section are attached at a first end at a cutter angle. The handle is attached to the first and second curved sections at a second end. The bag is attached to the first and second curved sections with fixing elements. The leaf-shaped frame provides maneuverability of this tool within a cluster of fruit or tree branches, where an angled shape helps catching and holding fruit. The scissors-like tip offers efficiency in releasing fruit from its stem. Finally, this fruit picker boasts applicability to multiple kinds of fruit.

20 Claims, 6 Drawing Sheets

(56) References Cited

U.S. PATENT DOCUMENTS

| | | | | |
|---|---|---|---|---|
| 669,169 | A * | 3/1901 | Hodges | A01D 46/247 56/333 |
| 1,619,731 | A * | 3/1927 | Hughes | A01D 46/247 30/136 |
| 2,653,403 | A * | 9/1953 | Oslund | A01K 77/00 43/11 |
| 2,900,780 | A * | 8/1959 | Kaiser | A01D 46/247 56/339 |
| 3,081,591 | A * | 3/1963 | Coe | A01D 46/247 56/339 |
| 3,449,896 | A * | 6/1969 | Burgess | A01D 46/247 56/339 |
| 4,242,856 | A * | 1/1981 | Patton | A01D 46/247 56/339 |
| 4,573,310 | A * | 3/1986 | Friedel | A01D 46/26 47/1.43 |
| D301,825 | S * | 6/1989 | Kilpelainen | D8/7 |
| 4,928,461 | A * | 5/1990 | King | A01D 46/247 56/332 |
| 5,142,854 | A * | 9/1992 | Chua | A01D 46/247 56/335 |
| 5,463,859 | A * | 11/1995 | Perry | A01D 46/247 56/332 |
| 5,857,316 | A * | 1/1999 | Murdock | A01D 46/247 56/332 |
| 6,044,638 | A * | 4/2000 | Young | A01D 46/247 56/329 |
| D460,903 | S * | 7/2002 | Peplowski | D8/1 |
| 7,076,916 | B2 * | 7/2006 | Bianchini | A01M 1/2038 222/174 |
| 2002/0020161 | A1* | 2/2002 | Simmons | A01D 46/247 56/329 |

FOREIGN PATENT DOCUMENTS

| | | |
|---|---|---|
| JP | 2007-202537 A | 8/2007 |
| KR | 2020120005338 U | 7/2012 |

OTHER PUBLICATIONS

"Relefree ® Convenient Labor Saving Practical Horticultural Useful Fruit Picker Gardening Apple Pear Peach Picking Tools New High Quality" from amazon.com, p. 1, Retrieved on Jan. 21, 2016 at http://www.amazon.com/Relefree%C2%AE-Convenient-Practical-Horticultural-Gardening/dp/B00UYKPCGS/ref=sr_1_4?ie=UTF8&qid=1449364698&sr=8-4&keywords=fruits+picker.

"The Twister Fruit Picker" from amazon.com, p. 1, Retrieved on Jan. 21, 2016 at http://www.amazon.com/The-Twister-Fruit-Picker/dp/B000BBCUD8/ref=sr_1_5?ie=UTF8&qid=1449364698&sr=8-5&keywords=fruits+picker.

* cited by examiner

FRUIT PICKER

BACKGROUND

Technical Field

The present disclosure relates to a fruit picker having an angled leaf shape. More particularly, the present disclosure relates to a fruit picker having an angled leaf shape with a scissors-like cutter at its tip.

Description of Related Art

Various designs exist for fruit picking devices for picking fruits such as apples, oranges and the like. Conventionally, those fruits are picked by hands or devices that may include round frames with bags or bulky baskets and that have simple fruit pulling mechanisms like rake-shaped tops or fruit-grippers. For example, a fruit picker sold by Kw's has rake-shaped craws with an integrally formed basket that is made of metal wires. Relefree® sold by Relefree also has rake-shaped frame with a bag attached to it. The Twister Fruit Picker has pinching part to pinch and hold the fruit. While existing fruit picking devices are generally suitable for what is regarded as ordinary performance, there is room for improvement in terms of maneuverability within a cluster of fruit or tree branches, efficiency in releasing fruit from its stem, and applicability to multiple kinds of fruit.

SUMMARY

To address the above-discussed improvement, it is an object of the present application to provide fruit picker that includes first and second curved sections, a handle and a bag. The first and second curved sections are outwardly curved to form a leaf-shaped space therebetween. The first curved section and a second curved section are attached at a first end at a cutter angle. The handle is attached to the first and second curved sections at a second end. The bag is attached to the first and second curved sections with fixing elements.

The leaf-shaped frame provides maneuverability of this tool within a cluster of fruit or tree branches, where an angled shape helps catching and holding fruit. The scissors-like tip offers efficiency in releasing fruit from its stem. Finally, this fruit picker boasts applicability to multiple kinds of fruit.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

It is understood that the following disclosure provides many different embodiments, or examples, for implementing different features of the disclosure. Specific examples of components and arrangements are described below to simplify the present disclosure. These are, of course, merely examples and are not intended to be limiting.

Referring generally to FIGS. 1-6, a fruit picker 10 includes an angled leaf-shaped frame 20 and a removable bag 30 attached to the frame 20.

Figure 1:
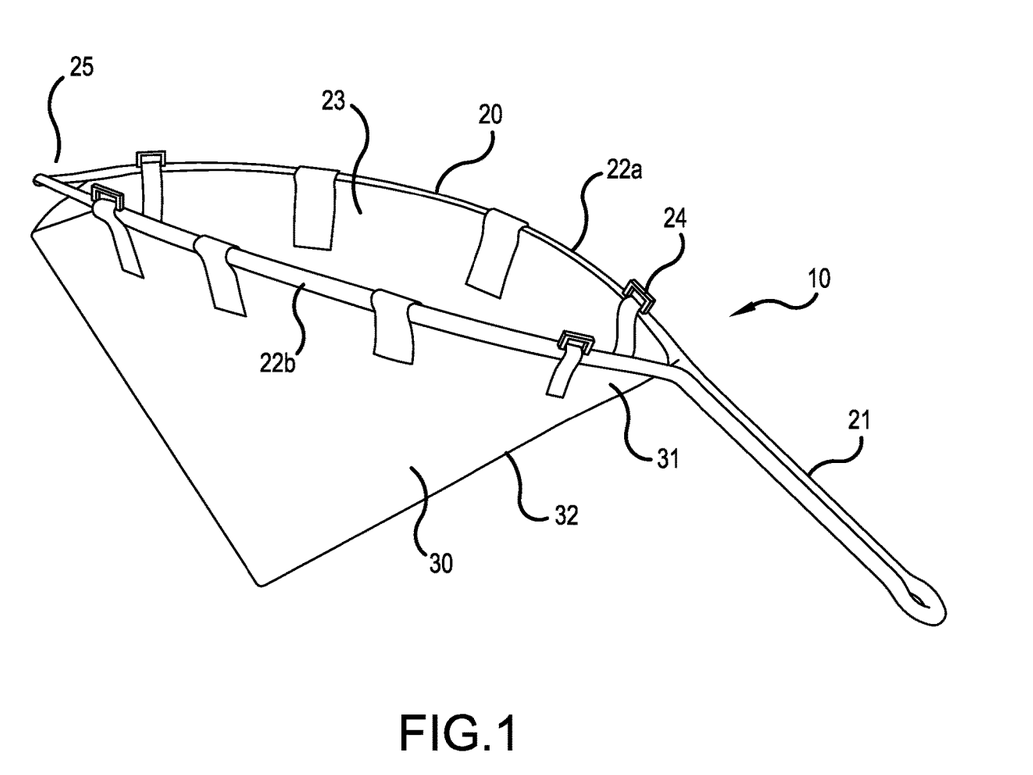
FIG. 1 is a perspective view of a fruit picker according to an exemplary embodiment of the present application.
Figure 2A:
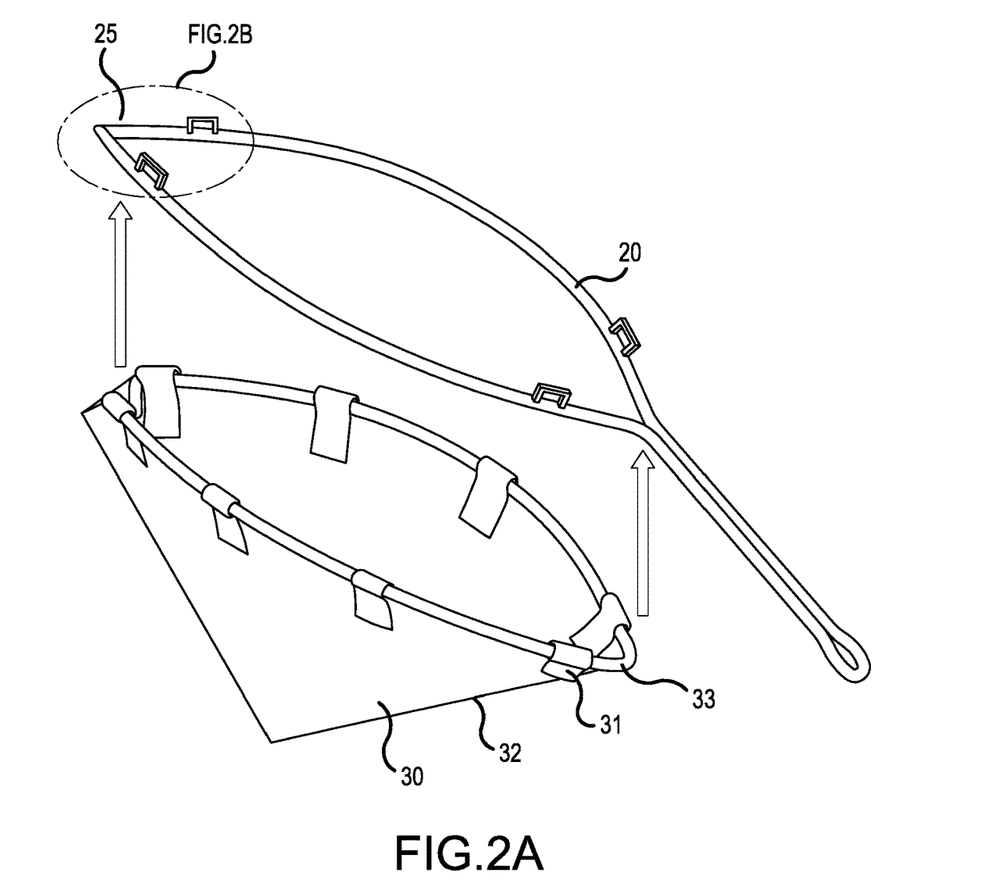
FIG. 2A is a perspective view of the fruit picker with a bag being separated from a frame.

As shown in FIG. 1, the frame 20 of the fruit picker 10 includes a handle 21 and curved sections 22a and 22b. The handle 21 and the curved sections 22a and 22b may be integrally formed by a single piece or may be made separately and attached together. The handle 21 has a sufficient length for an operator to hold during operation. As shown in FIG. 2A, the handle may be formed by bending a section of frame so that frame sections extend in parallel or may be formed by a separate part. The handle 21 may have a loop at an end. The handle 21 may also include an attachment part at the end for attaching the fruit picker 10 to a rod or the like for picking fruit at an elevated position. Moreover, the handle 21 may include a cushion material for more comfortable holding.

The curved sections 22a and 22b of the frame 20 are curved to create a space 23 in the center for allowing a fruit to pass through during the picking. Each of the curved sections 22a and 22b may include fixing parts 24 for attaching the bag 30. Shapes of the fixing parts 24 include, but not limited to, projections, U-shaped hooks, L-shaped hooks, loops, holes, and any known shape for attaching such a bag. The number of the fixing parts 24 on each of the curved sections 22a and 22b may be determined based on the size of the bag 30, the material of the bag 30, and/or weight of the fruit to be placed in the bag 30.

Figure 2B:
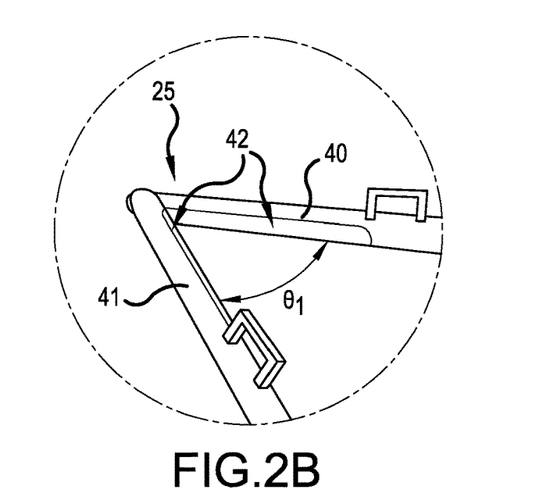
FIG. 2B is an enlarged view of a part of the perspective view shown in FIG. 2A.

As shown in FIGS. 2A and 2B, ends 40 and 41 of the curved sections 22a and 22b meet at a front end 25. The ends 40 and 41 are attached by welding or the like, and one of the ends 40 and 41 is placed over the other at a cutter angle $\theta_1$. The cutter angle $\theta_1$ may be small enough to provide a scissors-like effect to cut a fruit stem and may be in a range of about 25-90 degrees to provide a sufficient cutting force. A thickness of the ends 40 and 41 may be reduced towards the tip end 25. That is, the thickness of the ends 40 and 41 on the side of the front end 25 is smaller than on the side of the fixing parts 24. Each of the ends 40 and 41 includes a blade 42 for cutting a stem of the fruit. A length of the blade 42 may be 1-2 inches. The blades 42 face each other symmetrically at a contact point between the ends 40 and 41 to provide the scissors-like effect. This arrangement forms a scissors-like cutter or a V-shaped cutter at the front end 25.

As shown in FIGS. 1 and 2A, the fruit picker 10 has a leaf-like shape. The frame progressively narrows from the widest center of the curved sections 22a and 22b to two opposite directions, forming the front end 25 and a point end at which the handle 21 is attached. This particular shape improves maneuverability of the fruit picker 10 within a cluster of fruit or tree branches or the like, by making it glide effortlessly in order to gently target individual fruits and/or to move the picker in and out of crowded environment without damaging either fruit or tree branches.

Figure 3:
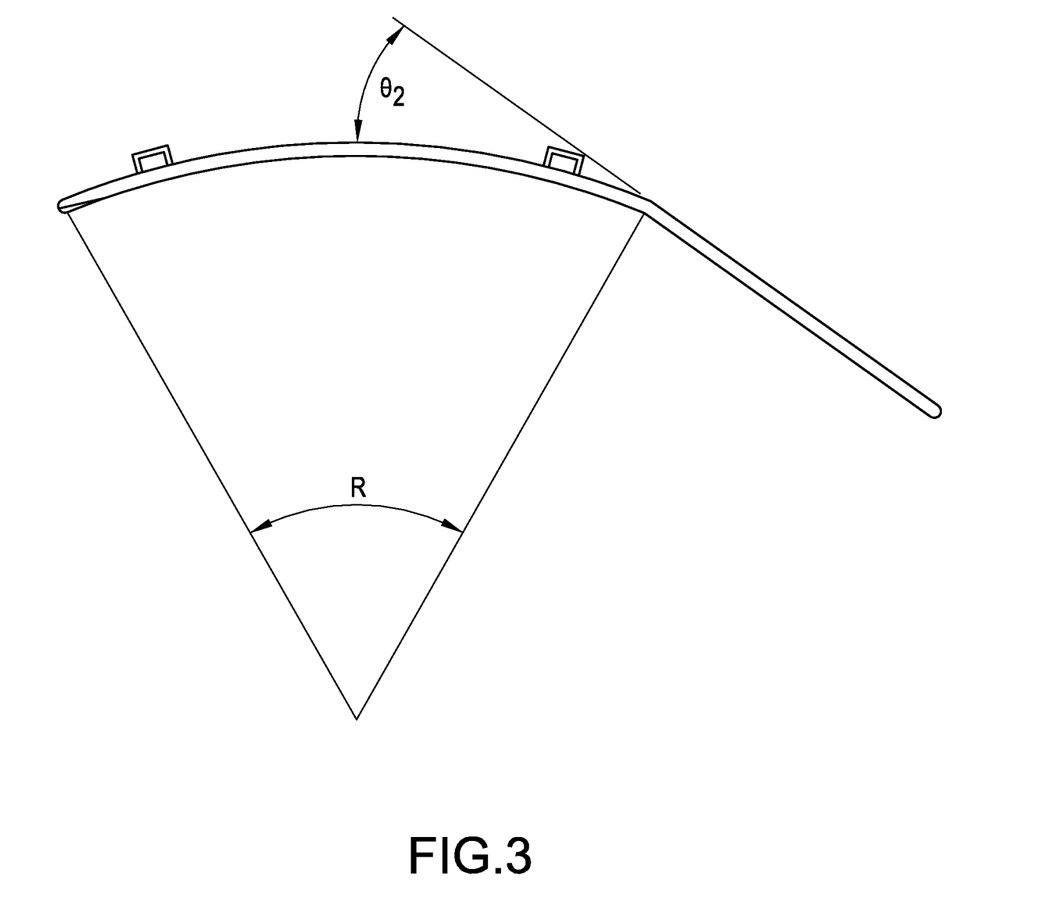
FIG. 3 is a side view of the fruit picker.

As best shown in FIG. 3, the leaf-shaped frame 20 bends relative to the handle 21. A bending angle $\theta_2$ may be about 15-30 degrees. In addition, the leaf-shape gently curves from the handle base to the front tip at a curvature radius R of about 50-60 degrees. These angles help make fruit-pulling more easily as well as better hold fruit inside the bag. Also, with these angles, the operator can navigate the fruit picker 10 between tree branches from a direction above the fruit more easily, especially when the fruit picker 10 is attached to a rod, since the tip end 25 points to the direction of the operator's motion.

Figure 4:
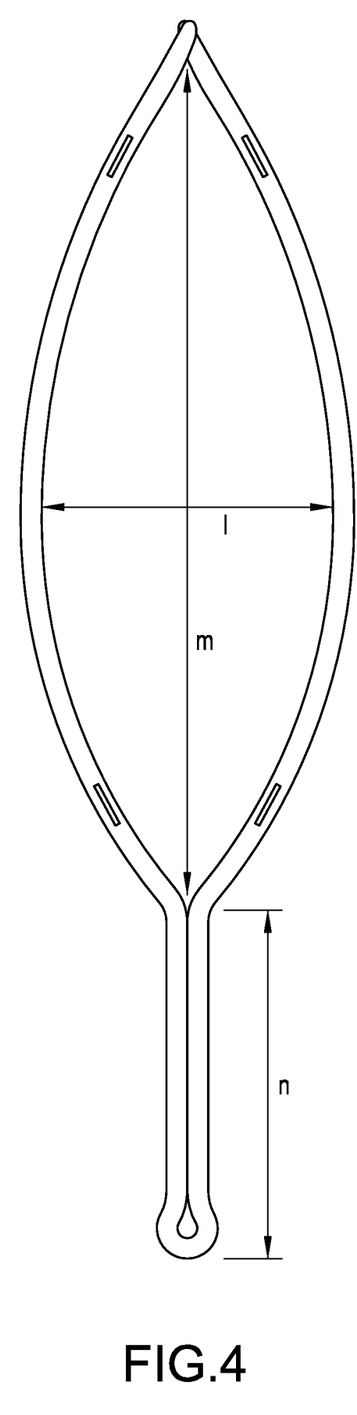
FIG. 4 is a top view of the fruit picker.

Furthermore, as shown in FIG. 4, the leaf-shaped fruit picker 10 may have a horizontal length l of 5-10 inches and a vertical length m of 10-20 inches. The handle 30 may be 5-15 inches (n) long. These dimensions may vary depending on the kind of fruit to be picked without changing the leaf-like shape of the frame 20.

As shown in FIG. 1, the bag 30 to be attached to the curved sections 22a and 22b includes fixing elements 31 and a bag element 32. The bag 30 may also include a rim 33. The fixing elements 31 may be hooks, strings, openings, hook-and-loop fasteners such as Velcro® loops, or the like, which may be easily removed. Alternatively, the bag 30 may be permanently attached to the curved sections 22a and 22b. The bag 30 may have a conical shape with a pointing or round bottom, or may have a trapezoidal shape with a flat bottom. A length of the bag 30 is greater than the vertical length m of the frame so that the inside edge of the bag 30 at the front end that corresponds to the front end 25 of the frame 20 protrudes approximately 0.50 inches from the point where the blades 40 meet. The front end of the bag 30 has also a slanted part. This formation allows the stem of the fruit to be positioned between the blades 40 easier. Also this formation contributes to easy entry of the fruit in the bag 30 after cutting. The bag 30 may be made of washable, durable, stain-resistant material, such as fabric and vinyl, which makes its maintenance easy. Unlike basket-type pickers or meshed bags, it protects fruits better and would not become caught up by branches. The size of the bag 30 may be determined by the type of fruit to be picked. For example, for fruits that can be easily damaged, such as peaches, a shallow bag may be preferable. On the other hand, for fruits that are not easily damaged, a larger bag may be used to collect more with a single operation for efficiency. Moreover, a long tube material may be attached to the curved sections for correcting and placing the fruit directly in a container.

Figure 5:
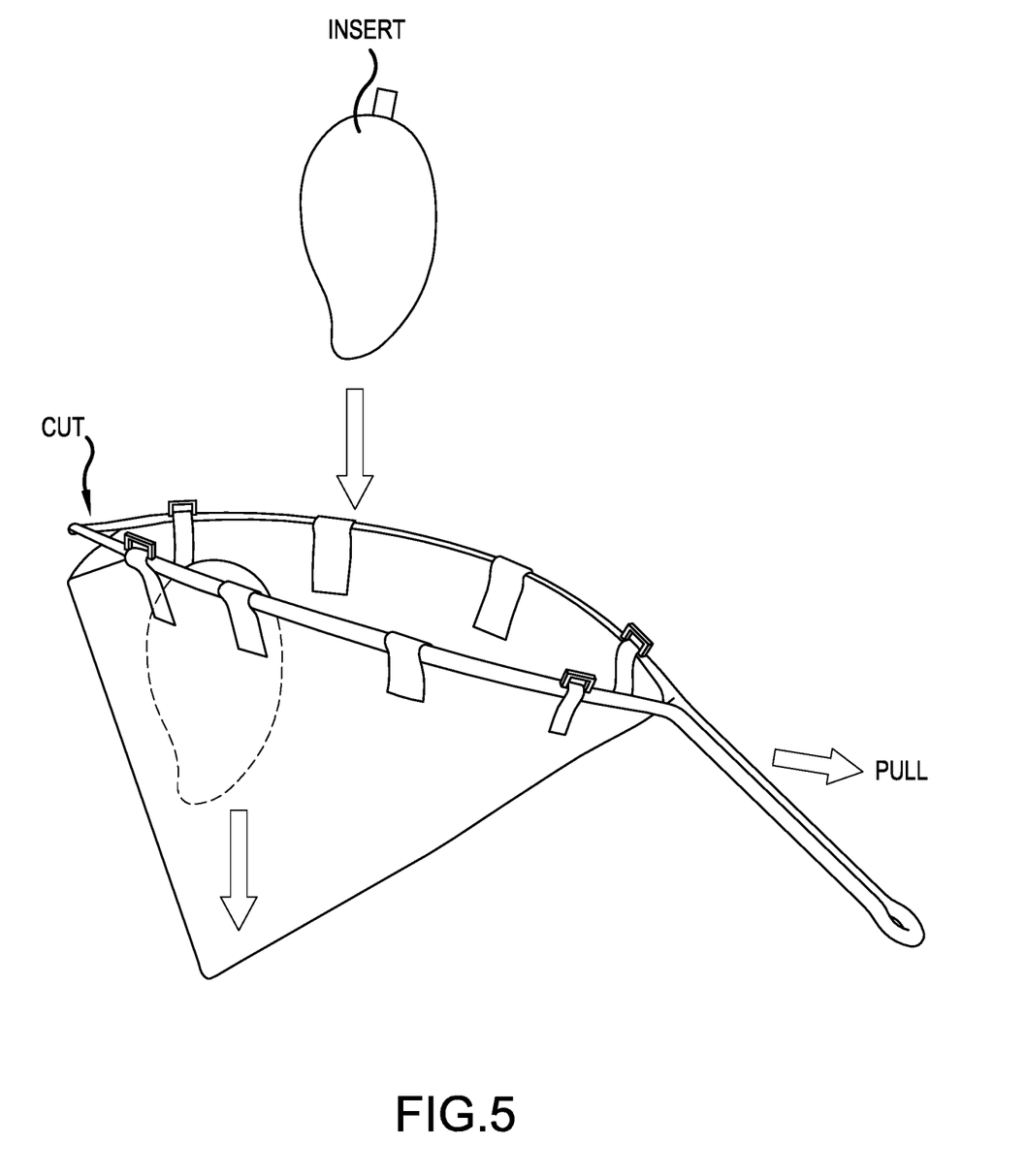
FIG. 5 is a view illustrating an operation of the fruit picker.
Figure 6:
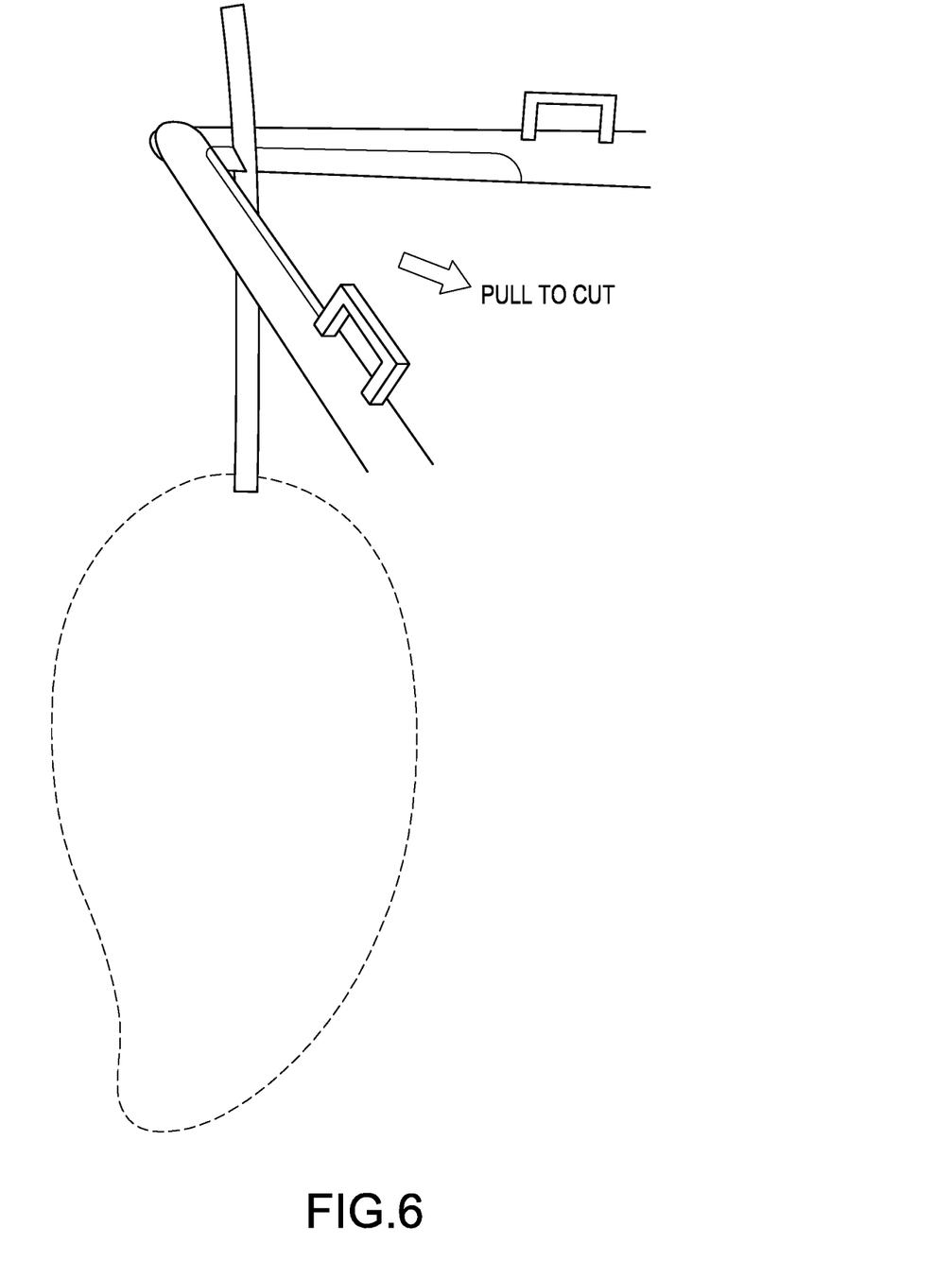
FIG. 6 is a view illustrating another view of the operation of the fruit picker.

Since it smoothly cuts fruit stems, fruit-picking cannot be any easier than this, compared to physically pull fruit out of its stem. The blades at the tip end also help reduce damages in fruit as well as in tree branches. As generally shown in FIGS. 5 and 6, to cut the tree stem, a fruit is first placed in the space 23 between the curved sections 22a and 22b of the frame 20. Then, the operator pulls the fruit picker 10 towards the operator. As the front end 25 of the frame 20 contacts the fruit stem, the blades 42 in V-shape starts cutting the fruit stem. When the fruit stem is completely cut, the fruit drops in the bag 30. Since the blades 42 are located at the tip end 25, the fruit simply slides down along the side of the bag 30 after being cut by the blades 42. This prevents the fruit from being dropped to a bottom of the bag 30, which may cause the fruit to be damaged. The fruit picker according to the present application is applicable to multiple kinds of fruit, from very small ones to those as big as the size of the bag. Because of its leaf-shaped frame, which progressively narrows from the widest center to the front end tip, different sizes of fruit are accommodated within that frame without any compromises in performing fruit picking.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined by the appended claims.

The invention claimed is:

1. A fruit picker, comprising:
first and second curved sections that are each outwardly curved to have a single curvature starting from a first end to a second end, the first and second curved sections being in a direct contact with each other and form acute angles at the first and second ends, respectively, so as to form an elongated space enclosed by the first and second curved sections between the first and second ends with acute inner angles at the front and second ends, a lower surface of the first curved section at the first end is directly in contact with and immovably fixedly attached to an upper surface of the second curved section at the first end at a cutter angle;
a handle attached to the first and second curved sections at the second end; and
a bag attached to the first and second curved sections, wherein
the bag has a cutout section at the first end, and the cutout section is separated from the first end as the cutout section is downwardly inclined from the first and second curved sections.

2. The fruit picker according to claim 1, wherein
the first and second curved sections each include a blade, the blade of the first curved section being in a direct contact with and overlap with and the blade of the second curved section at the first end.

3. The fruit picker according to claim 2, wherein
the blade of the first curved sections and the blade of the second curved sections are attached at the cutter angle of about 25-90 degrees.

4. The fruit picker according to claim 1, wherein
the first and second curved sections each include a plurality of fixing parts formed thereon, and
the bag includes a plurality of fixing elements to be attached to the fixing parts for attaching the bag to the frame.

5. The fruit picker according to claim 4, wherein the fixing parts are openings.

6. The fruit picker according to claim 4, wherein the fixing elements are hook and loop fasteners.

7. The fruit picker according to claim 1, wherein the first and second curved sections are also curved downwardly.

8. The fruit picker according to claim 1, wherein the first and second curved sections are downwardly angled relative to the handle.

9. The fruit picker according to claim 1, wherein the handle includes an attachment element for allowing an external object to be attached.

10. The fruit picker according to claim 1, wherein the first and second curved sections and the handle are integrally formed.

11. The fruit picker according to claim 1, wherein the bag has a conical shape.

12. The fruit picker according to claim 1, wherein bag is made of washable fabric.

13. The fruit picker according to claim 1, wherein the bag is made of durable, stain-resistant fabric.

14. The fruit picker of claim 1, wherein the bag is removable from the first and second curved sections.

15. The fruit picker of claim 1, wherein the bag is permanently attached to the first and second curved sections.

16. The fruit picker according to claim 1, wherein
the first and second curved sections are each made of a single frame.

17. A fruit picker, comprising:
first and second curved sections that are each formed by a single frame and are outwardly curved with a single curvature and in a direct contact with each other and form acute angles at first and second ends of the first and second curved sections, respectively, so as to form an elongated space enclosed by the first and second curved sections between the first and second ends with acute inner angles at the front and second ends, the first curved section and a second curved section being immovably fixedly attached at the first end at a cutter angle such that the first and second curved sections overlap each other at the first end;
a handle attached to the first and second curved sections at a second end; and
a bag attached to the first and second curved sections, wherein
the first and second curved sections each include a blade integrally formed at a section close to the first end,
a lower surface of the blade of the first curved section is in a direct contact with and immovably fixedly attached to an upper surface of the blade of the second curved section at the first end, and
the bag has a cutout section at the first end, and the cutout section is separated from the first end as the cutout section is downwardly inclined from the first and second curved sections.

18. A fruit picker, comprising:
first and second curved sections that are outwardly curved and are in a direct contact with each other to form acute angles at first and second ends of the first and second curved sections, respectively, so as to form an elongated space with a single horizontal curvature of each of the first and second curved sections in a top view of the fruit picker between the first and second ends of the first and second curved sections with acute inner angles at the front and second ends and are also curved downwardly with a single vertical curvature of each of the first and second curved sections in a side view of the fruit picker starting from the first end to a second end of the first and second curved sections, a lower surface of the first curved section at the first end is in a direct contact with and immovably fixedly attached to an upper surface of the second curved section at the first end at a cutter angle;
a handle attached to the first and second curved sections at the second end; and
a bag attached to the first and second curved sections, wherein
the first and second curved sections each have a single three-dimensional curvature, and
the bag has a cutout section at the first end, and the cutout section is separated from the first end as the cutout section is downwardly inclined from the first and second curved sections.

19. The fruit picker according to claim 18, wherein
the first and second curved sections are each made of a single frame.

20. The fruit picker according to claim 18, wherein
the first and second curved sections each include a blade, the blade of the first curved section being in a direct contact with and overlap with and the blade of the second curved section at the first end.

* * * * *